US010055661B2

(12) United States Patent
Oganezov et al.

(10) Patent No.: US 10,055,661 B2
(45) Date of Patent: Aug. 21, 2018

(54) SKIN TEXTURE-BASED AUTHENTICATION (71) Applicant: Intel Corporation, Santa Clara, CA (US)

(72) Inventors: Alexander Oganezov, Portland, OR (US); Shamim Begum, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/667,267

(22) Filed: Mar. 24, 2015

(65) Prior Publication Data
US 2016/0283808 A1 Sep. 29, 2016

(51) Int. Cl.
G06K 9/00 (2006.01)
G06F 21/32 (2013.01)

(52) U.S. Cl.
CPC ......... *G06K 9/00885* (2013.01); *G06F 21/32* (2013.01); *G06K 9/00006* (2013.01); *G06K 9/00013* (2013.01); *G06K 9/00067* (2013.01); *G06K 9/00087* (2013.01)

(58) Field of Classification Search
None
See application file for complete search history.

(56) References Cited

U.S. PATENT DOCUMENTS 5,937,082 A * 8/1999 Funada .............. G06K 9/00067
382/125
6,002,785 A * 12/1999 Ucida ................ G06K 9/00087
340/5.83
6,018,586 A * 1/2000 Kamei ............... G06K 9/00067
382/125
6,067,369 A * 5/2000 Kamei ................ G06K 9/4633
382/125
6,799,726 B2 * 10/2004 Stockhammer .... G06K 9/00013
235/382
6,898,299 B1 * 5/2005 Brooks .................... G06K 9/00
340/5.52
9,483,682 B1 * 11/2016 Chiang .............. G06F 17/3028
2003/0021452 A1 * 1/2003 Hamid ............... G06K 9/00067
382/124

(Continued)

FOREIGN PATENT DOCUMENTS

JP 2006107288 A 4/2006
WO WO-2014033842 A1 3/2014

OTHER PUBLICATIONS

Breebaart, J., Busch, C., Grave, J., & Kindt, E. (Sep. 2008). A Reference Architecture for Biometric Template Protection based on Pseudo Identities. In BIOSIG (pp. 25-38).*

(Continued)

Primary Examiner — Vu Le
Assistant Examiner — Samah Beg
(74) Attorney, Agent, or Firm — Schwegman Lundberg & Woessner, P.A.

(57) ABSTRACT

Various systems and methods for implementing skin texture-based authentication are described herein. A system comprises a capture module to obtain at a wearable device worn by a user, an input representation of the user's skin; an analysis module to identify a set of features in the input representation; and an authentication module to authenticate the user based on the set of features.

21 Claims, 4 Drawing Sheets

(56) References Cited

U.S. PATENT DOCUMENTS

| | | | |
|---|---|---|---|
| 2003/0046228 A1* | 3/2003 | Berney | G06F 21/32 705/41 |
| 2003/0118215 A1* | 6/2003 | Mizoguchi | G06K 9/00013 382/115 |
| 2004/0136573 A1 | 7/2004 | Sato | |
| 2005/0025364 A1* | 2/2005 | Kim | G06K 9/00375 382/190 |
| 2005/0221798 A1 | 10/2005 | Sengupta et al. | |
| 2006/0195328 A1* | 8/2006 | Abraham | G06Q 20/204 235/382 |
| 2008/0200790 A1* | 8/2008 | Kim | A61B 5/0507 600/365 |
| 2009/0067686 A1* | 3/2009 | Boshra | G06F 21/32 382/124 |
| 2010/0165090 A1* | 7/2010 | Sweeney | G06K 9/00033 348/77 |
| 2010/0189316 A1* | 7/2010 | Walch | G06K 9/0008 382/125 |
| 2011/0019918 A1* | 1/2011 | Monden | G06K 9/00087 382/190 |
| 2012/0016231 A1* | 1/2012 | Westmoreland | A61B 5/0059 600/425 |
| 2012/0042369 A1* | 2/2012 | Fan | G06F 21/32 726/7 |
| 2012/0169464 A1* | 7/2012 | Aoki | G06K 9/00926 340/5.82 |
| 2012/0230555 A1* | 9/2012 | Miura | G06K 9/00087 382/124 |
| 2013/0101185 A1* | 4/2013 | Farkash | G06K 9/0008 382/124 |
| 2013/0279768 A1* | 10/2013 | Boshra | G06F 21/32 382/124 |
| 2014/0237587 A1* | 8/2014 | Forbes | G06F 21/00 726/18 |
| 2015/0010215 A1* | 1/2015 | Fukuda | G06K 9/00013 382/115 |
| 2015/0062086 A1 | 3/2015 | Nattukallingal | |
| 2015/0228278 A1* | 8/2015 | Huang | G10L 17/04 382/118 |
| 2016/0042356 A1* | 2/2016 | Jakobson | G06Q 20/40145 705/21 |
| 2016/0300094 A1* | 10/2016 | Lu | G06K 9/00885 |

OTHER PUBLICATIONS

"International Application Serial No. PCT/US2016/019324, International Search Report dated May 31, 2016", 3 pgs.

"International Application Serial No. PCT/US2016/019324, Written Opinion dated May 31, 2016", 6 pgs.

* cited by examiner

SKIN TEXTURE-BASED AUTHENTICATION

TECHNICAL FIELD

Embodiments described herein generally relate to user authentication and in particular, to skin texture-based authentication.

BACKGROUND

User identification and authentication are often used as authorization methods for access control. Common examples of access control include use of photo identification, use of a password or personal identification number (PIN), use of a keycard, access card, or other physical token, or use of biometric information, such as retinal scans, fingerprints, or voice analysis.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide skin texture-based authentication. A person's skin is made up of several layers including the subcutis, dermis, and epidermis layers. The epidermis layer is the outmost layer of skin and is composed of multiple layers of cells with the stratum corneum layer being the most superficial layer of the epidermis and the layer that is exposed to the outside environment. The outermost layer of the epidermis presents various patterns of wrinkles. These wrinkles, also referred to as sulci cutis or glyphic patterns, are furrows that cross each other to form various polygons. The wrinkle patterns are unique to the individual. The wrinkle patterns along with other features such as moles, pores, spots, freckles, warts, etc., make up the skin texture.

Figure 1:
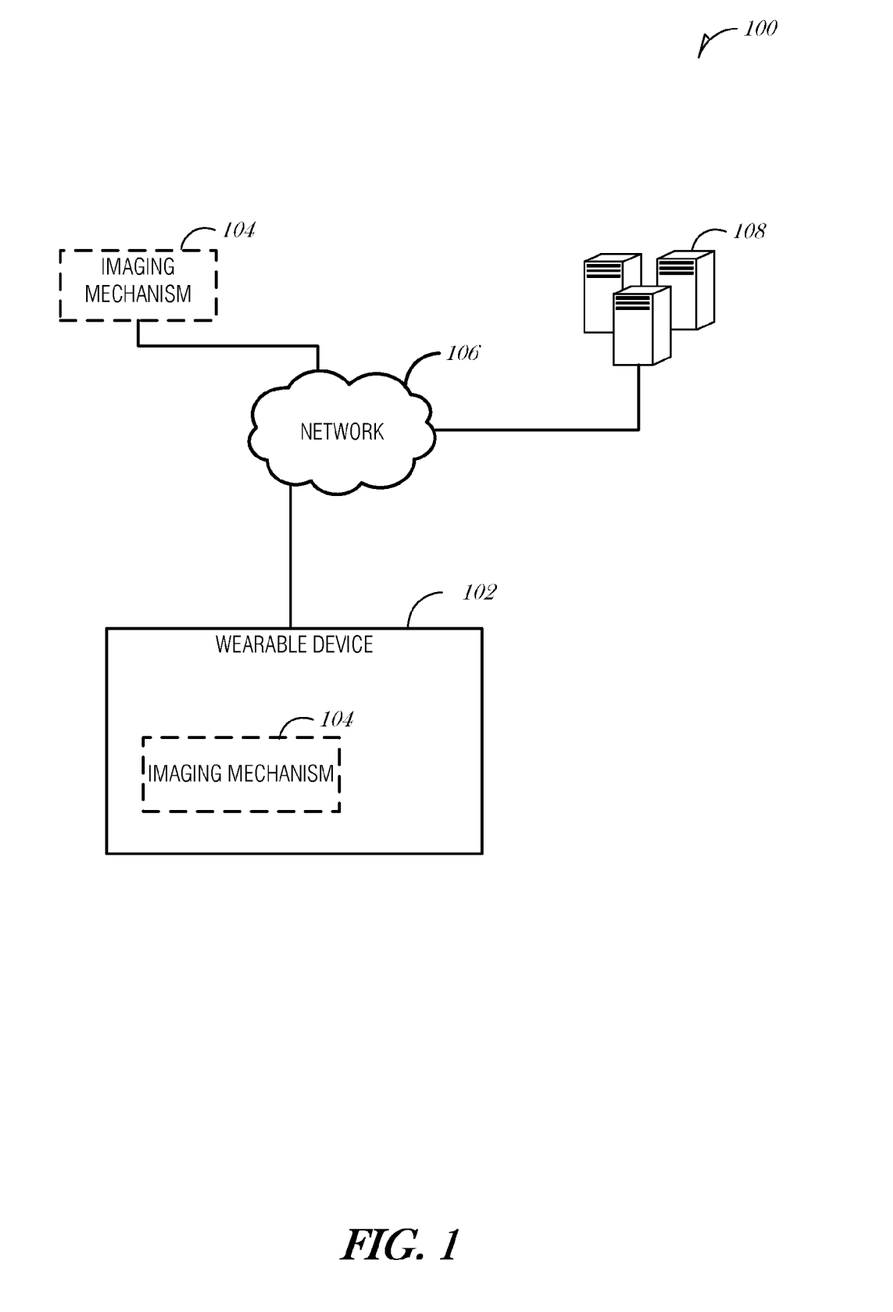
FIG. 1 is a schematic drawing illustrating a system for skin texture-based authentication, according to an embodiment.

FIG. 1 is a schematic drawing illustrating a system 100 for skin texture-based authentication, according to an embodiment. The system 100 includes a wearable device 102 having an imaging mechanism 104. The wearable device 102 may be communicatively coupled via a network 106 to a server system 108. The wearable device 102 may be a device such as a wrist-worn device, a head-worn device, a shirt, or other type of wearable compute device.

The imaging mechanism 104 may include one or more cameras, such as charge-coupled device (CCD) cameras or complementary metal oxide semiconductor (CMOS) cameras. The imaging mechanism 104 may also include one or more light sources, such as light-emitting diodes (LED). For some applications, the imaging mechanism 104 may include a single camera. In other applications, the imaging mechanism 104 may include multiple cameras. An array of cameras may be used with a corresponding array of light sources. Various embodiments are described further below. The imaging mechanism 104 may be incorporated into the wearable device 102 or be communicatively connected to the wearable device 102.

The network 106 may include local-area networks (LAN), wide-area networks (WAN), wireless variant networks (e.g., wireless LAN (WLAN) such as a network conforming to an IEEE 802.11 family of standards or a wireless WAN (WWAN) such as a cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices in FIG. 1 may be coupled to the network 106 via one or more wired or wireless connections.

The wearable device 102 may also be communicatively coupled to the server system 108. The server system 108 may provide one of a variety of services including, but not limited to, data analysis, data storage, or the like.

In use, a user is able to wear the wearable device 102. In an embodiment, the imaging mechanism 104 acquires a representation of the user's skin under or near the wearable device 102. For example, the wearable device 102 may be a wrist-based device, in which case, the imaging mechanism 104 may capture a patch of skin on the bottom of the wrist. The imaging mechanism 104 may be situated in various positions in a wearable device 102 depending on the design aesthetics, operational requirements, and the like. For example, in a wrist-based device, the imaging mechanism 104 may be positioned on the underside of the wrist near where a clasp is conventionally located. This positioning may be partially for aesthetics to reduce the size or shape of the operational portion of the wrist-based device (e.g., the watch face portion). This positioning of the imaging mechanism 104 may also be for operational efficiencies—there is less hair on the underside of the wrist, resulting in less interference when capturing the skin's features.

Figure 2:
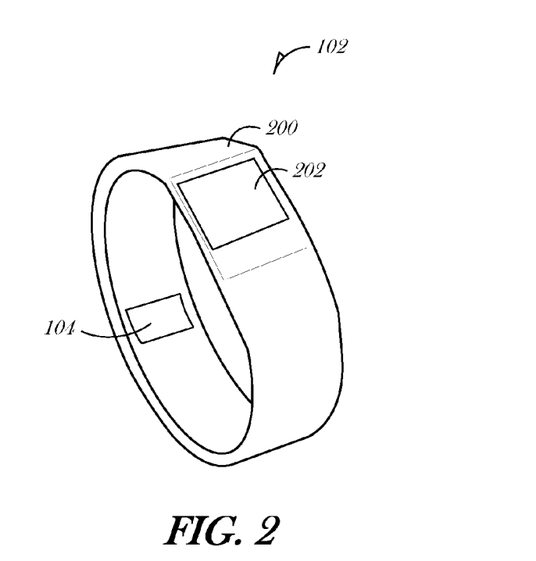
FIG. 2 illustrates a wearable device according to an embodiment.

FIG. 2 illustrates a wearable device 102 according to an embodiment. The wearable device 102 includes a wrist band 200, a display 202, and an imaging mechanism 104. The display 202 may be used to present various information, such as the time, email notifications, text, etc. to the user. The imaging mechanism 104 may include an array of light sources, e.g., LEDs, to illuminate the skin under the imaging mechanism 104. In addition, the imaging mechanism 104 may include one or more cameras to capture a representation of the skin.

A user may be prompted via the display 202 to adjust the wearable device 102 a few times during initialization, during which the imaging mechanism 104 may capture one or more representations of the skin. The prompt may be provided after the user has already been authenticated, such as with a username/password combination, PIN, or other security feature. During initialization, the imaging mechanism 104 may capture initial images of the skin to establish a baseline image or set of images (e.g., four images). Such initialization may be performed when the user first begins use of the wearable device 102, such as right after purchase, or at regular intervals, such as every three months. Sampling a new baseline image or set of images may be used to account for gradual natural skin texture changes due to time, damage to the skin, skin art, pigmentation changes, skin diseases or rash, hair cover changes, and the like. If the user decided to wear the wearable device 102 in a different place, such as the alternative wrist, the user may manually initiate the initialization process to capture a new baseline of images. The user may execute such functions from a secured component of the wearable device 102, such as a configuration user interface provided to the user after being logged in with a username/password combination, biometric authentication, a PIN, or the like.

While FIG. 2 illustrates the wearable device 102 as a wrist-worn device, it is understood that the wearable device 102 may be any type of wearable, such as glasses, mask, shirt, socks, pants, gloves, or any e-textile that contacts or is close proximity to the skin. For example, in a glasses-based device, the imaging mechanism 104 may be incorporated into a temple of the wearable device 102, such that an image of the skin near the anatomical temple of the user's head may be captured.

Figure 3:
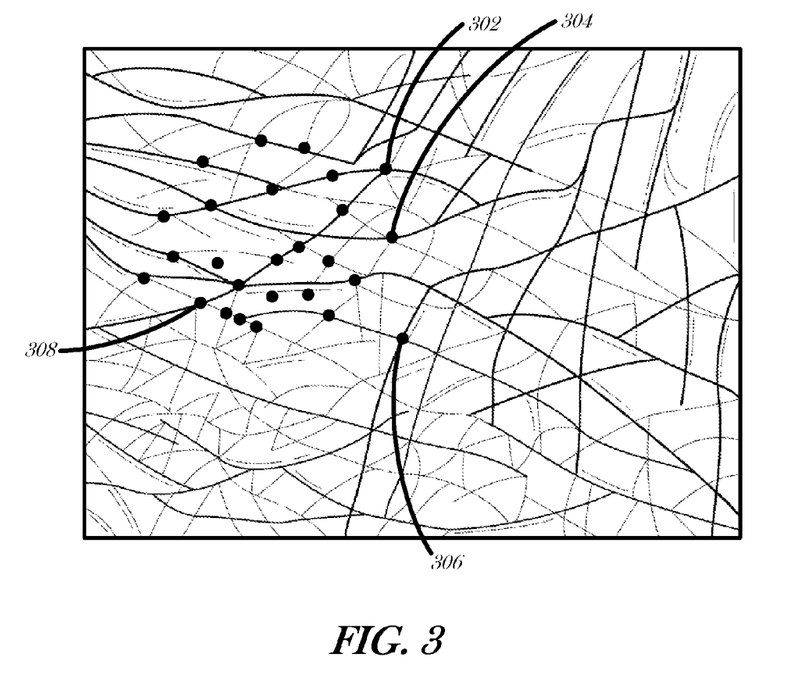
FIG. 3 is an example representation of a skin image, according to an embodiment.

FIG. 3 is an example representation of a skin image 300, according to an embodiment. In some embodiments, images of the skin may be captured and used as the baseline for later attempts to authenticate a user. Image analysis may be used to compare a captured image with a previously-stored image and determine whether there is a match or a high confidence of a match. Various image classification techniques may be used, such as a sparse representation technique, which extracts the features of the image for later use in a matching operation.

Alternatively, the skin image 300 may be processed using an image digitizer to generate a graph of vertices found in the glyphic patterns of the skin. Vertices 302, 304, 306, and 308 (along with others) may be identified in the skin image 300. In this approach, scanned images are first processed using an image digitizer to generate a graph. The graph is stored in a database to be later used for comparison during an authentication phase. Intersecting points in the skin image 300 are represented as a vertex $v_i$ <$x_i,y_i$>, where $x_i$ and $y_i$ are x-y coordinate values. A set V contains vertices generated from the skin image 300.

Various graph comparison algorithms may be used to compare a graph generated from an input image with one that is generated from a baseline image. In an example, given an image with N vertices, the connectivity graph may be represented as a N×N matrix M in which the value of $M_{i,j}$ is 1 if the vertices i and j are connected in the image and is 0 otherwise (i.e., not connected). Thus an image may be stored as <V,M> tuple. During the authentication phase tuple <V,M> that represents the current scanned skin texture is compared to stored tuples representing baseline images.

While not every vertex identified in the skin image 300 needs to be included in the graph or the set V, a reasonable number are needed to ensure uniqueness across several people. A design tradeoff between computational efficiency and statistical accuracy may be made by the implementer of the system. In other words, while more vertices may be useful to more confidently ensure that the person in question is authenticated, the more vertices used also increases the computational and storage cost, which may impact the user experience.

During authentication, the corresponding graphs of the baseline image and the input image are compared. Various methods of measuring graph similarity may be used to determine the similarity of the stored baseline graph and the graph generated form the input image. Learning based approaches may be applied in order to define a threshold for the similarity measurement such that graphs with a similarity value that exceeds the threshold are accepted as a match.

Compared to an image-based approach, a graph-based method is less expensive in terms of storage and allows greater flexibility in selection of thresholds for approximate image matching.

Figure 4:
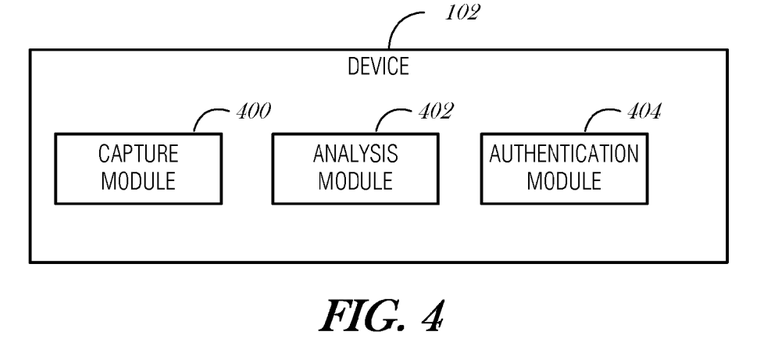
FIG. 4 is a block diagram illustrating a wearable device, according to an embodiment.

FIG. 4 is a block diagram illustrating a wearable device 102, according to an embodiment. The wearable device 102 includes a system for skin texture-based authentication having a capture module 400, an analysis module 404, and an authentication module 406.

The capture module 400 may be configured to obtain at a wearable device worn by a user, an input representation of the user's skin. The analysis module 402 may be configured to identify a set of features in the input representation. The authentication module 404 may be configured to authenticate the user based on the set of features.

In an embodiment, to obtain the input representation, the capture module 400 is to capture an image of the user's skin using a camera incorporated into the wearable device 102.

In an embodiment, to identify the set of features in the input representation, the analysis module 402 is to identify wrinkles in the input representation of the user's skin, identify a set of vertices in the wrinkles, and store the set of vertices as a part of the set of features. In a further embodiment, each vertex in the set of vertices is stored as an x-y coordinate in the input representation of the user's skin. In a further embodiment, the set of features comprises a connectivity graph of the set of vertices. In a further embodiment, to authenticate the user based on the set of features, the authentication module 404 is to determine whether the connectivity graph of the set of vertices is similar to a connectivity graph of a baseline image and authenticate the user when the connectivity graph of the set of vertices is similar to the connectivity graph of the baseline image. In a further embodiment, to determine whether the connectivity graph of the set of vertices is similar to the connectivity graph of the baseline image, the authentication module 404 is to use a similarity threshold, where the connectivity graph of the set of vertices is considered similar to the connectivity graph of the baseline image when the similarity threshold is exceeded.

In an embodiment, to authenticate the user based on the set of features, the authentication module 404 is to perform an image comparison with the input representation of the user's skin and a baseline image of the user's skin.

In an embodiment, the capture module 400 is to capture a baseline image of the user's skin. This may occur during an initialization phase, for example, when the user first obtains the wearable device 102 or first uses it.

In an embodiment, the analysis module 402 is to generate a connectivity graph of the baseline image of the user's skin. The connectivity graph of the baseline image may be used to later authenticate the user.

In an embodiment, the wearable device 102 comprises a wrist-worn device.

In an embodiment, the authentication module 404 is to provide access to a computing resource in response to the user being authenticated. The computing resource may be any type of resource, including but not limited to access to an application executing on the wearable device or remote from the wearable device, unlocking or providing access to functions of the wearable device 102, unlocking or providing access to functions of a device communicatively coupled to the wearable device 102, or the like.

Figure 5:
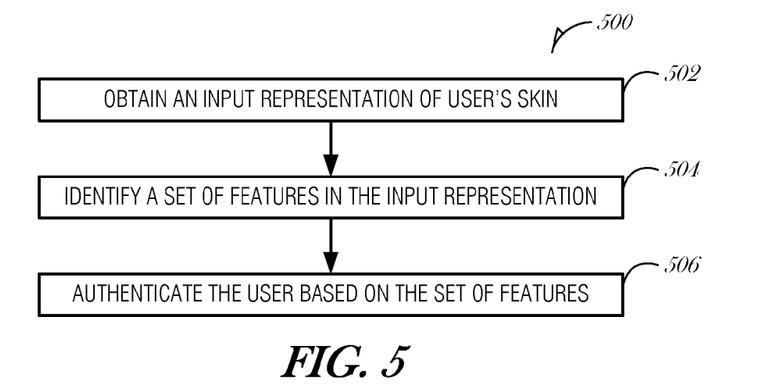
FIG. 5 is a flowchart illustrating a method of implementing skin texture-based authentication, according to an embodiment.

FIG. 5 is a flowchart illustrating a method 500 of implementing skin texture-based authentication, according to an embodiment. At block 502, an input representation of the user's skin is obtained at a wearable device worn by the user. At block 504, a set of features in the input representation is identified. At block 506, the user is authenticated based on the set of features.

In an embodiment, obtaining the input representation comprises capturing an image of the user's skin using a camera incorporated into the wearable device. In a further embodiment, identifying the set of features in the input representation comprises identifying wrinkles in the input representation of the user's skin, identifying a set of vertices in the wrinkles, and storing the set of vertices as a part of the set of features. In a further embodiment, each vertex in the set of vertices is stored as an x-y coordinate in the input representation of the user's skin. In a further embodiment, the set of features comprises a connectivity graph of the set of vertices. In a further embodiment, authenticating the user based on the set of features comprises determining whether the connectivity graph of the set of vertices is similar to a connectivity graph of a baseline image, and authenticating the user when the connectivity graph of the set of vertices is similar to the connectivity graph of the baseline image. In a further embodiment, determining whether the connectivity graph of the set of vertices is similar to the connectivity graph of the baseline image comprises using a similarity threshold, wherein the connectivity graph of the set of vertices is considered similar to the connectivity graph of the baseline image when the similarity threshold is exceeded.

In an embodiment, authenticating the user based on the set of features comprising performing an image comparison with the input representation of the user's skin and a baseline image of the user's skin.

In an embodiment, the method 500 includes capturing a baseline image of the user's skin. In a further embodiment, the method 500 includes generating a connectivity graph of the baseline image of the user's skin.

In an embodiment, the wearable device comprises a wrist-worn device.

In an embodiment, the method 500 includes providing access to a computing resource in response to the user being authenticated.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
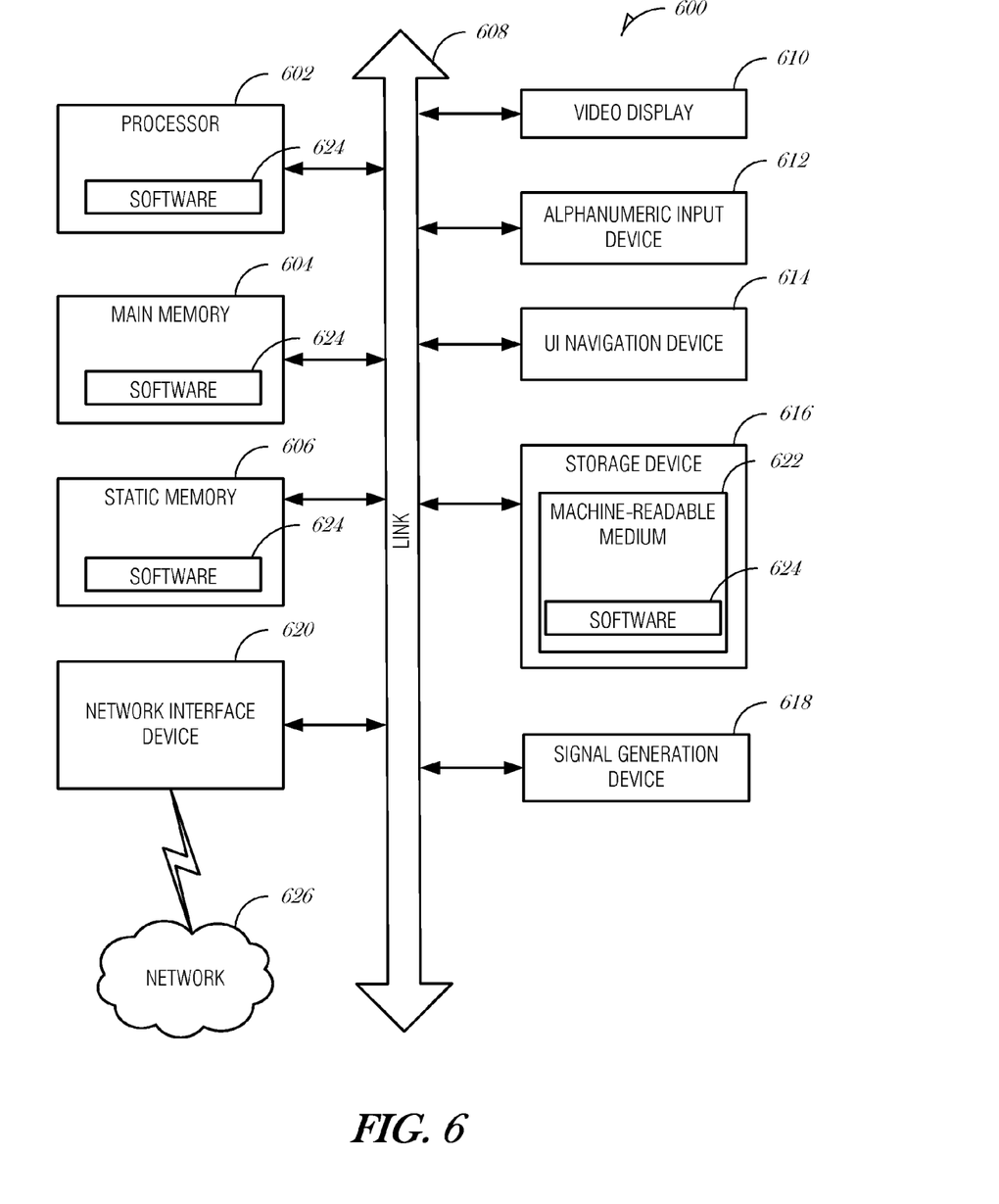
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 includes subject matter for skin texture-based authentication (such as a device, apparatus, or machine) comprising: a capture module to obtain at a wearable device worn by a user, an input representation of the user's skin; an analysis module to identify a set of features in the input representation; and an authentication module to authenticate the user based on the set of features.

In Example 2, the subject matter of Example 1 may include, wherein to obtain the input representation, the capture module is to capture an image of the user's skin using a camera incorporated into the wearable device.

In Example 3, the subject matter of any one of Examples 1 to 2 may include, wherein to identify the set of features in the input representation, the analysis module is to: identify wrinkles in the input representation of the user's skin; identify a set of vertices in the wrinkles; and store the set of vertices as a part of the set of features.

In Example 4, the subject matter of any one of Examples 1 to 3 may include, wherein each vertex in the set of vertices is stored as an x-y coordinate in the input representation of the user's skin.

In Example 5, the subject matter of any one of Examples 1 to 4 may include, wherein the set of features comprises a connectivity graph of the set of vertices.

In Example 6, the subject matter of any one of Examples 1 to 5 may include, wherein to authenticate the user based on the set of features, the authentication module is to: determine whether the connectivity graph of the set of vertices is similar to a connectivity graph of a baseline image; and authenticate the user when the connectivity graph of the set of vertices is similar to the connectivity graph of the baseline image.

In Example 7, the subject matter of any one of Examples 1 to 6 may include, wherein to determine whether the connectivity graph of the set of vertices is similar to the connectivity graph of the baseline image, the authentication module is to use a similarity threshold, wherein the connectivity graph of the set of vertices is considered similar to the connectivity graph of the baseline image when the similarity threshold is exceeded.

In Example 8, the subject matter of any one of Examples 1 to 7 may include, wherein to authenticate the user based on the set of features, the authentication module is to perform an image comparison with the input representation of the user's skin and a baseline image of the user's skin.

In Example 9, the subject matter of any one of Examples 1 to 8 may include, wherein the capture module is to capture a baseline image of the user's skin.

In Example 10, the subject matter of any one of Examples 1 to 9 may include, wherein the analysis module is to generate a connectivity graph of the baseline image of the user's skin.

In Example 11, the subject matter of any one of Examples 1 to 10 may include, wherein the wearable device comprises a wrist-worn device.

In Example 12, the subject matter of any one of Examples 1 to 11 may include, wherein the authentication module is to provide access to a computing resource in response to the user being authenticated.

Example 13 includes subject matter for skin texture-based authentication (such as a method, means for performing acts, machine readable medium including instructions that when performed by a machine cause the machine to performs acts, or an apparatus to perform) comprising: obtaining at a wearable device worn by a user, an input representation of the user's skin; identifying a set of features in the input representation; and authenticating the user based on the set of features.

In Example 14, the subject matter of Example 13 may include, wherein obtaining the input representation comprises capturing an image of the user's skin using a camera incorporated into the wearable device.

In Example 15, the subject matter of any one of Examples 13 to 14 may include, wherein identifying the set of features in the input representation comprises: identifying wrinkles in the input representation of the user's skin; identifying a set of vertices in the wrinkles; and storing the set of vertices as a part of the set of features.

In Example 16, the subject matter of any one of Examples 13 to 15 may include, wherein each vertex in the set of vertices is stored as an x-y coordinate in the input representation of the user's skin.

In Example 17, the subject matter of any one of Examples 13 to 16 may include, wherein the set of features comprises a connectivity graph of the set of vertices.

In Example 18, the subject matter of any one of Examples 13 to 17 may include, wherein authenticating the user based on the set of features comprises: determining whether the connectivity graph of the set of vertices is similar to a connectivity graph of a baseline image; and authenticating the user when the connectivity graph of the set of vertices is similar to the connectivity graph of the baseline image.

In Example 19, the subject matter of any one of Examples 13 to 18 may include, wherein determining whether the connectivity graph of the set of vertices is similar to the connectivity graph of the baseline image comprises using a similarity threshold, wherein the connectivity graph of the set of vertices is considered similar to the connectivity graph of the baseline image when the similarity threshold is exceeded.

In Example 20, the subject matter of any one of Examples 13 to 19 may include, wherein authenticating the user based on the set of features comprise performing an image comparison with the input representation of the user's skin and a baseline image of the user's skin.

In Example 21, the subject matter of any one of Examples 13 to 20 may include, capturing a baseline image of the user's skin.

In Example 22, the subject matter of any one of Examples 13 to 21 may include, generating a connectivity graph of the baseline image of the user's skin.

In Example 23, the subject matter of any one of Examples 13 to 22 may include, wherein the wearable device comprises a wrist-worn device.

In Example 24, the subject matter of any one of Examples 13 to 23 may include, providing access to a computing resource in response to the user being authenticated.

Example 25 includes at least one machine-readable medium including instructions, which when executed by a machine, cause the machine to perform operations of any of the Examples 13-24.

Example 26 includes an apparatus comprising means for performing any of the Examples 13-24.

Example 27 includes subject matter for skin texture-based authentication (such as a device, apparatus, or machine) comprising: means for obtaining at a wearable device worn by a user, an input representation of the user's skin; means for identifying a set of features in the input representation; and means for authenticating the user based on the set of features.

In Example 28, the subject matter of Example 27 may include, wherein the means for obtaining the input representation comprise means for capturing an image of the user's skin using a camera incorporated into the wearable device.

In Example 29, the subject matter of any one of Examples 27 to 28 may include, wherein the means for identifying the set of features in the input representation comprise: means for identifying wrinkles in the input representation of the user's skin; means for identifying a set of vertices in the wrinkles; and means for storing the set of vertices as a part of the set of features.

In Example 30, the subject matter of any one of Examples 27 to 29 may include, wherein each vertex in the set of vertices is stored as an x-y coordinate in the input representation of the user's skin.

In Example 31, the subject matter of any one of Examples 27 to 30 may include, wherein the set of features comprises a connectivity graph of the set of vertices.

In Example 32, the subject matter of any one of Examples 27 to 31 may include, wherein the means for authenticating the user based on the set of features comprise: means for determining whether the connectivity graph of the set of vertices is similar to a connectivity graph of a baseline image; and means for authenticating the user when the connectivity graph of the set of vertices is similar to the connectivity graph of the baseline image.

In Example 33, the subject matter of any one of Examples 27 to 32 may include, wherein the means for determining whether the connectivity graph of the set of vertices is similar to the connectivity graph of the baseline image comprise means for using a similarity threshold, wherein the connectivity graph of the set of vertices is considered similar to the connectivity graph of the baseline image when the similarity threshold is exceeded.

In Example 34, the subject matter of any one of Examples 27 to 33 may include, wherein the means for authenticating the user based on the set of features comprise means for performing an image comparison with the input representation of the user's skin and a baseline image of the user's skin.

In Example 35, the subject matter of any one of Examples 27 to 34 may include, means for capturing a baseline image of the user's skin.

In Example 36, the subject matter of any one of Examples 27 to 35 may include, means for generating a connectivity graph of the baseline image of the user's skin.

In Example 37, the subject matter of any one of Examples 27 to 36 may include, wherein the wearable device comprises a wrist-worn device.

In Example 38, the subject matter of any one of Examples 27 to 37 may include, means for providing access to a computing resource in response to the user being authenticated.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for skin texture-based authentication, the system comprising:
   a bracelet;
   an image capture device in the bracelet to:
      obtain an input representation of a patch of skin at an underside of a wrist of a user when the user is wearing the bracelet; and
      capture a baseline image of the patch of skin;
   an analysis circuit in the bracelet to:
      identify a set of features in the input representation;
      identify a set of vertices based on glyphic patterns in the underside of the wrist; and
      create a connectivity graph for the set of vertices of the patch of skin, the connectivity graph comprising a matrix associated with the vertices indicating if each pair of vertices is connected; and
   an authentication circuit in the bracelet to:
      authenticate the user based on the connectivity graph;
      prompt the user to establish a new baseline image after a regular interval of time, the new baseline image used in place of the baseline image for subsequent authentication; and
      wherein a user is prompted during initialization to adjust the bracelet, wherein the image capture device takes corresponding differing baseline images of different areas of the patch of skin at an underside of a wrist of the user.

2. The system of claim 1, wherein the analysis circuit is to store the set of vertices as a part of the set of features.

3. The system of claim 2, wherein each vertex in the set of vertices is stored as an x-y coordinate in the input representation of the patch of skin.

4. The system of claim 1. wherein the analysis circuit is to generate a baseline connectivity graph of the baseline image of the patch of skin.

5. The system of claim 1 wherein the authentication circuit is to provide access to a computing resource in response to the user being authenticated.

6. The system of claim 1, wherein a baseline connectivity graph is created for the user as a baseline for checking if the user is wearing the bracelet.

7. The system of claim 6, wherein to authenticate the user based on the connectivity graph, the authentication circuit is to:
   determine whether the matrix of the connectivity graph is similar to a baseline matrix of the baseline connectivity graph; and
   authenticate the user when the matrix of the connectivity graph is similar to the baseline matrix.

8. The system of claim 7, wherein to determine whether the matrix of the connectivity graph is similar to the baseline matrix of the baseline connectivity graph , the authentication circuit is to use a similarity threshold, wherein the matrix of the connectivity graph is considered similar to the baseline matrix of the baseline connectivity graph when the similarity threshold is exceeded.

9. The system of claim 1, further comprising:
   a light source near the image capture device.

10. The system of claim 1. wherein the authentication circuit is to provide access to a display on the bracelet in response to the user being authenticated.

11. A method of skin texture-based authentication, the method comprising:
   obtaining, by an image capture device at a bracelet worn by a user, an input representation of a patch of skin at an underside of a wrist of the user when the user is wearing the bracelet;
   capturing a baseline image of the patch of skin;
   identifying a set of features in the input representation;
   identifying a set of vertices based on glyphic patterns in the underside of the wrist;
   creating a connectivity graph for the set of vertices of the patch of skin, the connectivity graph comprising a matrix associated with the vertices indicating if each pair of vertices is connected;
   authenticating the user based on the connectivity graph;
   prompting the user to establish a new baseline image after a regular interval of time, the new baseline image used in place of the baseline image for subsequent authentication; and
   prompting a user during initialization to adjust the bracelet, wherein the image capture device takes corresponding differing baseline images of different areas of the patch of skin at an underside of a wrist of the user.

12. The method of claim 11, further comprising:
   storing the set of vertices as a part of the set of features.

13. The method of claim 12, wherein each vertex in the set of vertices is stored as an x-y coordinate in the input representation of the patch of skin.

14. The method of claim 11, wherein a baseline connectivity graph is created for the user as a baseline for checking if the user is wearing the bracelet.

15. The method of claim 14, wherein authenticating the user based on the connectivity graph comprises:
   determining whether the matrix of the connectivity graph is similar to a baseline matrix of the baseline connectivity graph; and
   authenticating the user when the matrix of the connectivity graph is similar to the baseline matrix.

16. The method of claim 15, wherein determining whether the matrix of the connectivity graph is similar to the baseline matrix of the baseline connectivity graph whether the matrix of the connectivity graph is similar to the baseline matrix of the baseline connectivity graph comprises using a similarity threshold, wherein the matrix of the connectivity graph is considered similar to the baseline matrix of the baseline connectivity graph when the similarity threshold is exceeded.

17. The method of claim 11, further comprising:
providing access to a display on the bracelet in response to the user being authenticated.

18. At least one non-transitory machine-readable medium including instructions, which when executed by a machine, cause the machine to:
obtain, by an image capture device at the bracelet worn by the user, an input representation of a patch of skin at an underside of a wrist of the user when the user is wearing the bracelet;
capture a baseline image of the patch of skin;
identify a set of features in the input representation;
identify a set of vertices based on glyphic patterns in the underside of the wrist;
create a connectivity graph for the set of vertices of the patch of skin, the connectivity graph comprising a matrix associated with the vertices indicating if each pair of vertices is connected;
authenticate the user based on the connectivity graph;
prompt the user to establish a new baseline image after a regular interval of time, the new baseline image used in place of the baseline image for subsequent authentication; and
prompt a user during initialization to adjust the bracelet, wherein the image capture device takes corresponding differing baseline images of different areas of the patch of skin at an underside of a wrist skin of the user.

19. The at least one machine-readable medium of claim 18, further comprising instructions to:
store the set of vertices as a part of the set of features.

20. The at least one machine-readable medium of claim 18, further comprising instructions to provide access to a computing resource in response to the user being authenticated.

21. The at least one machine-readable medium of claim 18, wherein a baseline connectivity graph is created for the user as a baseline for checking if the user is wearing the bracelet.

\* \* \* \* \*

UNITED STATES PATENT AND TRADEMARK OFFICE
CERTIFICATE OF CORRECTION

PATENT NO. : 10,055,661 B2
APPLICATION NO. : 14/667267
DATED : August 21, 2018
INVENTOR(S) : Oganezov et al.

Page 1 of 1

It is certified that error appears in the above-identified patent and that said Letters Patent is hereby corrected as shown below:

In the Claims

In Column 12, Line 1, in Claim 4, delete "claim 1." and insert --claim 1,-- therefor In Column 12, Line 4, in Claim 5, delete "claim 1" and insert --claim 1,-- therefor In Column 12, Line 20, in Claim 8, delete "graph ," and insert --graph,-- therefor In Column 12, Line 27, in Claim 10, delete "claim 1." and insert --claim 1,-- therefor Signed and Sealed this
Fifth Day of January, 2021

Andrei Iancu
*Director of the United States Patent and Trademark Office*